Fig. 1

Joseph R. Fox
Jerry R. Marlow, &
Robert H. Schaefer
BY A. M. Heiter
ATTORNEY

3,505,907
Patented Apr. 14, 1970

3,505,907
TRANSMISSION AND CONTROLS

Joseph R. Fox, Brownsburg, Jerry R. Marlow, Greenwood, and Robert H. Schaefer, Westfield, Ind., assignors to General Motors Corporation, Detroit, Mich., a corporation of Delaware
Filed Apr. 4, 1968, Ser. No. 718,702
Int. Cl. F16h 5/02, 5/34
U.S. Cl. 74—753                     19 Claims

ABSTRACT OF THE DISCLOSURE

A transmission is disclosed having a reverse and plural forward ratio range unit and a two ratio splitter unit having a control system having a shift valve for each range ratio and a splitter shift valve for the splitter unit. A fluid supply is connected to the highest forward ratio shift valve which when upshifted engages the highest forward ratio and when downshifted feeds the next lower forward shift valve. Each forward shift valve functions in the same manner and the lowest forward shift valve feeds the reverse shift valve. The range shift valves are spring biased to upshift position, biased to downshift by fluid in a downshift chamber which may be vented by an upshift solenoid vent valve and biased or held upshifted by fluid in an upshift chamber controlled by adjacent shift valves and/or unblocking solenoid vent valves to provide a latching device. For upshifting, the higher ratio shift valve first upshifts to effect the ratio shift and then the lower ratio shift valve downshifts to latch the higher ratio shift valve upshifted. On some upshifts the lower ratio exhaust is free until the lower ratio shift valve downshifts and then is restricted until the trimmer regulator valve increases the engaging pressure for the higher ratio to a pre-determined value. For downshifting, the lower ratio shift valve first upshifts to unlatch the higher ratio shift valve for its downshift to effect the ratio shift. On downshifts the exhausts are free or restricted. On a 4–5 shift where both a range and splitter ratio are engaged and disengaged, the engagement time is longer because two motors are actuated so the exhaust from two motors diengaging is restricted by the exhaust control valve normally used to control the exhaust from one motor. The latching system will hold any properly upshifted range shift valve in upshift position until the next lower or any higher shift valve is upshifted or an unblocking solenoid is activated. When a solenoid does not operate on command or operates without command some forward ratio drive ratio will remain operative.

---

The invention relates to transmissions and particularly controls for multiratio power shifting transmissions.

The transmission has a range gear unit having reverse range drive and a plurality of increasing ratio forward range drives and a splitter unit having two splitter ratio drives. One or both of the splitter ratio drives are selectively used with each range drive to provide the transmission ratios. A range shift valve and fluid motor controls each range drive and a splitter shift valve and a motor for each splitter drive controls the splitter ratio drives. The manual control has stepped positions in the sequence; reverse, neutral and a plurality of increasing forward ratio positions which actuate the respective range shift value and motor to provide in that sequence reverse and increasing forward range ratios in some manual control steps providing no shift or a downshift in the splitter unit and no forward range upshift in other manual control steps providing a splitter upshift. In neutral all range shift valves are downshifted for a positive neutral in the range unit and splitter low drive is engaged. In each overall transmission drive one range and one splitter drive is engaged.

With the power train at rest the range shift valves are upshifted, for engagement, and the splitter shift valve is downshifted, for low, by the valve springs but there is no fluid pressure to engage any drive. With the manual control in neutral, when the input drives the pumps to provide a fluid supply, a priority valve first supplies a control feed line connected to each range shift valve downshift chamber, with its solenoid vent valve closed, to downshift each range shift valve and is also connected to a splitter valve upshift chamber, with its solenoid vent valve open, to leave the splitter shift valve downshifted.

Fluid pressure is then supplied to the highest ratio range shift valve which if downshifted exhausts its ratio motor to disengage the highest range ratio and feeds the next lower drive shift valve. If the highest range shift valve is upshifted by energizing its solenoid to vent its downshift chamber, this valve exhausts the feed to the next lower shift valve to disengage any lower ratio and feeds its ratio motor to establish the highest ratio. Each next lower shift valve functions in the same way except the reverse shift valve does not supply a lower shift valve so that the highest upshifted shift valve will engage its drive and disengage all lower drives regardless of whether the lower drive shift valves are in the upshift or downshift positions.

When a selected upshift solenoid is energized to vent the downshift chamber of the selected range shift valve, that valve immediately upshifts. Through all the other range upshift solenoids are de-energized and the downshift chambers under pressure, the previously upshifted next higher or lower range ratio shift valve does not simultaneously downshift but only downshifts after the selected shift valve upshifts. On an upshift, the upshifted selected range shift valve engages the selected range ratio drive, disengages the lower ratio drive and operates the latching device to permit downshift of the previously upshifted lower ratio shift valve, and then latches the upshifted selected higher ratio shift valve in upshift position. On a downshift, the upshifted selected range shift valve establishes a feed and exhaust connection, but both are exhaused at the upshifted higher shift valve, and unblocks the higher shift valve so it can downshift to supply the established feed to engage the selected lower ratio, disengage the previously established higher ratio and operate a latching device to hold the selected shift valve upshifted.

On an upshift to a selected higher ratio, the exhaust of the lower ratio is, by the upshift of the higher shift valve connected momentarily to a restricted exhaust, then on downshift of the lower shift valve, is connected to an exhaust control valve controlled by the trimmer valve for the higher ratio which provides a gradually increasing engaging pressure for the higher ratio and controls the exhaust of the lower ratio by preferably further restricting it until the pressure for the higher ratio increases to a predetermined value and begins regulation at the initial low value or shortly thereafter.

On a downshift to a selected lower ratio the exhaust of most higher ratios is free and the non-rotating motors are connected to a low pressure exhaust which keeps the motor filled but is insufficient to interfere with disengagement by the conventional retraction springs. The exhaust of some higher ratios is controlled by an exhaust control valve of the trimmer valve controlling engagement of the lower ratio as on an upshift. On a shift as the 4–5 shift, where two motors, range high and splitter low, are engaged more time is needed to supply fluid to engage two motors so the two motors being exhausted, range intermediate and splitter low, are both connected through one exhaust and the restriction of this exhaust is controlled by the trimmer valve regulating the pressure increase to one of the motors being engaged, the splitter low motor.

In neutral a higher trimmer booster actuator line pressure is provided to reset the trimmer valve. On a shift from neutral the boost pressure is exhausted for a timed period so the initial low regulated pressure provided by the trimmer valve for engaging for any initial engagement, low low, low, intermediate or reverse a ratio is lower than the initial pressure for engaging these forward ratios on a shift from another forward ratio.

The range forward shift valve latching devices function so that once any one of these shift valves is upshifted, it is held upshifted even though its solenoid valve closes pressurizing its downshift chamber, until another upshift electric solenoid vents the downshift chamber of the next lower or higher shift valve or a solenoid functions to vent its upshift chamber.

If the transmission is normally operating in a selected range ratio drive with only that range drive solenoid operative and it fails, the transmission will stay in that drive. If the next lower or higher range ratio drive solenoid is functional and is selected the transmission will shift to the selected range ratio drive. If the transmission is in a high range ratio and the next lower range ratio is not functional, the transmission will not downshift even though a still lower range ratio is functional and selected. If the transmission is in a low range ratio the transmission will shift to any higher range ratio that is functional and is selected.

If all the range shift valves are upshifted and the splitter shift value downshifted by the springs the transmission will be in 5th ratio.

An object of the invention is to provide an improved multiratio shifting control having a plurality of remote control signals operating a plurality of shift valves having interrelated latching mechanisms causing the control to maintain some drive ratio regardless of the signal received when in certain ratios.

Another object of the invention is to provide an improved multiratio shifting control having a plurality of remote control signals operating a plurality of shift valves having inter-related latching mechanisms causing the control to maintain the drive ratio on loss of the signal effecting the drive.

Another object of the invention is to provide an improved multiratio shifting control having a plurality of remote control signals operating a plurality of shift valves having inter-related latching mechanism causing the control to prevent downshifts unless the signal establishes the next lower ratio.

Another object of the invention is to provide an improved multiratio shifting control having a plurality of remote control signals operating a plurality of shift valves having inter-related latching mechanisms causing the control to permit upshifts to any higher ratio established by a signal.

Another object of the invention is to provide an improved multiratio shifting control having a latching mechanism holding a shift valve upshifted until the next lower or the next higher shift valve is downshifted.

Another object of the invention is to provide an improved multiratio shifting control having an exhaust pressure control controlling one exhaust in a single transition shift and controlling two exhausts on a double transition shift for increased delay of disagreement on a double transition shift relative to a single transition shift.

Another object of the invention is to provide an improved multiratio shifting control having an exhaust control of the lower ratio on an upshift to provide one restricted exhaust for a short period, then another restricted exhaust until the higher ratio engaging pressure reaches a predetermined value and then a free exhaust.

Another object of the invention is to provide an improved multiratio shifting control having a trimmer regulator valve for controlling the pressure increase to a ratio establishing motor controlled by a one regulated pressure in certain manual control positions and by another regulated pressure in another manual control position to change the initial pressure regulation value of the trimmer valve.

These and other objects of the invention will be more apparent from the following description and drawing of the preferred embodiment of the invention.

The transmission drive train of Patent 3,267,769, Tuck et al., is used and comprises a torque converter and lockup clutch unit 10 having a hydrodynamic torque converter 11 and a converter lockup clutch 12, a two speed torque splitter planetary gear unit 16, a three speed planetary gear unit 18, a torque multiplying and torque combining planetary gear unit 19 and a reversing planetary gear unit 21 all located in a transmission housing 22. These four gear units 16, 18, 19 and 21 offer, at least seven forward speeds and one reverse speed but the controls use six forward speeds and one reverse speed.

An engine, not shown, is connected to an input hub portion 24 to drive a torque converter housing 26 which has a rear curved portion to which the torque converter pump blades 28 are attached and a hub 29 which may be supported on a ground sleeve 31 secured to the transmission housing 22. The torque converter pump blades 28 deliver circulating fluid counterclockwise to the turbine blades 34 which are connected by an output hub 36 to rotatably drive in a forward direction a converter output shaft 38 which provides the input to the planetary gear units 16 and 19. As the fluid leaves the turbine blades 34, it is redirected to the pump blades 28 by stator blades 39 which are connected by a one-way brake 41 to the ground sleeve 31. The torque converter multiples the torque input to the pump blades 28 with the torque gradually decreasing from stall with increasing turbine blade speed until coupling where the turbine blades 34 obtain a speed close to pump blade speed and the stator blades 39 freewheel.

The converter lockup clutch 12 has drive plates 42 splined to the torque converter housing 26 and a driven plate 44 between these drive plates drivingly connected via the output hub 36 to the converter output shaft 38. This clutch when actuated by fluid supplied by line 45 to fluid motor 43 is effective to lock up the torque converter and provide a direct mechanical drive between the input hub 24 and the converter output shaft 38.

An auxiliary power take-off is provided by an annular gear 46 concentric with the converter output shaft 38 which is drivingly connected to the converter housing 26 and meshes with a gear 48. The gear 48 continuously rotates at a speed proportional to the speed of the input hub 24 and may be connected to drive the front pump 151 and auxiliary equipment, not shown.

Referring now to the range gearing, the two speed torque splitter planetary gear unit 16 comprises a torque splitter planetary gear set 54, the three speed planetary gear unit 18 comprises an intermediate planetary gear set 56 and a low planetary gear set 58, the torque multiplying and torque combining planetary gear unit 19 comprises a torque multiplying and torque combining planetary gear set 59 and the reversing planetary gear unit 21 comprises a reversing planetary gear set 61. The converter output shaft 38 provides the input to the range gearing and drives the input planet carrier 62 of the torque splitter planetary gear set 54 and the sun gear 64 of the torque multiplying and torque combining planetary gear set 59.

In the torque multiplying and torque combining planetary gear set 59, the sun gear 64 meshes with a plurality of planetary pinions 66 journaled on an output planet carrier 68 which is drivingly connected to an output shaft 69. Output shaft 69 is drivingly connected in any suitable manner to any load such as vehicle wheels. Pinions 66 mesh with a controlled ring gear 71 which may be restrained from rotation by a low low brake 72. When ring gear 71 is restrained from rotation by the supply of fluid by low line 73 to low low motor 73' to apply low low brake 72, the reaction at this gear will cause the output planet carrier 68 and thus the output shaft 69 to be revolved in the same direction as the sun gear 64 which is driven by the converter output shaft 38 but at a reduced speed with respect thereto to provide a low low drive ratio which is a simple planetary reduction drive and provides the greatest torque multiplication and speed reduction in the range gearing.

In the torque splitter planetary gear set 54, a plurality of planetary pinions 74 journaled on the input planet carrier 62 mesh with an output ring gear 76 and a controlled sun gear 78 which is secured to a hub 79. Connected to the hub 79 is a drum 81 which may be either restrained from rotation by an overdrive brake 82 or be prevented from rotation relative to the converter output shaft 38 by a direct drive clutch 84 which has a drive connection 86 to the converter output shaft 38. When fluid is supplied by splitter direct drive line 85 to direct drive motor 85', the direct drive clutch 84 is engaged, and relative rotation between sun gear 78 and converter output shaft 38 is prevented to lock up this gear set to provide the splitter low drive ratio, a direct drive or 1:1 ration between the ring gear 76 and the converter output shaft 38. When the sun gear 78 is restrained from rotation by the overdrive brake 82 on the supply of fluid by overdrive line 83 to overdrive motor 83' the reaction at this gear will cause the ring gear 76 to be revolved in the same direction as the converter output shaft 38 but at an increased speed with respect thereto to provide the splitter high drive ratio, an overdrive ratio, between the ring gear 76 and the converter output shaft 37.

The two speed torque splitter planetary gear unit 16 and the three speed planetary gear unit 18 acting in combination are effective to provide another input power or torque path to the torque multiplying and torque combining planetary gear unit 19 in addition to the input power or torque path provided to the latter gear unit by the converter output shaft 38 with the two speed planetary gear unit 16 apportioning the input torque from the torque converter between these two power paths. Connected to the output ring gear 76 of the torque splitter planetary gear set 54 is a drum 88 which has its hub connected to a sleeve 89 located concentric with the converter output shaft 38. Sleeve 89 is rotatably mounted in suitable bearings and is drivingly connected to the sun gear 91 of the intermediate planetary gear set 56 and to the sun gear 92 of the low planetary gear set 58. In the low planetary gear set 58, the sun gear 92 meshes with a plurality of planetary pinions 94 journaled on an output planet carrier 96 which is secured to a hub 98 rotatably mounted in suitable bearings and connected by a drive connection 99 to the ring gear 71 of the torque multiplying and torque combining planetary gear set 59. Pinions 94 mesh with a controlled ring gear 101 which may be restrained from rotation by a low brake 102 on the supply of fluid by low brake line 103 to low brake motor 103'. When ring gear 101 is restrained from rotation by the low brake 102, the reaction at the ring gear 101 will cause the planet carrier 96 and thus the ring gear 71 of the torque multiplying and torque combining planetary gear set 59 to be revolved in the same direction as the sun gear 92 but at a reduced speed with respect thereto to provide a low drive ratio.

In the intermediate planetary gear set 56, the sun gear 91 meshes with a plurality of planetary pinions 104 journaled on an output planet carrier 106 connected to a drum 108 which is secured to the ring gear 101 of the low planetary gear set 58. The pinions 104 mesh with a controlled ring gear 111 which may be either restrained from rotation by an intermediate brake 112 or prevented from rotation relative to sleeve 89 by a direct drive clutch 114 which has a drive connection 116 to the sleeve 89. When fluid is supplied by intermediate line 113 to intermediate motor 113', the intermediate brake 112 is engaged and the ring gear 111 is held stationary. The rotation of the sun gear 91 causes pinions 104 to orbit in the ring gear 111 and by means of planet carrier 106 and drum 108, drives ring gear 101 of the low planetary gear set 58 in the same direction as sleeve 89 but at a reduced speed relative thereto. Thus, the ring gear 101 and the sun gear 92 of the low planetary gear set 58 are driven at the reduction speed provided by the intermediate planetary gear set 56 and the input speed of sleeve 89 respectively. The differential speed between sun gear 92 and the ring gear 101 of the low planetary gear set 58 causes the pinions 94 to revolve about the sun gear 92 thus driving the output planet carrier 96 in the same direction but at a reduced speed relative to sleeve 89 to provide an intermediate drive ratio which is higher than the low drive ratio previously mentioned provided by the low planetary gear set 58.

When fluid is supplied by range direct drive line 115 to direct drive motor 115', the direct drive clutch 114 is engaged. Then the ring gear 111 is prevented from rotation relative to sun gear 91 and the pinions 104 are prevented from rotating relative to ring gear 111 and sun gear 91 to lock up the intermediate planetary gear set 56. Since the planet carrier 106 which is connected to drive the ring gear 101 of the low planetary gear set 58 is thus caused to rotate at the same speed as sleeve 89, the ring gear 101, sun gear 92 and pinions 94 of the low planetary gear set 58 are effectively locked up and rotate together without relative rotation and drive planet carrier 96 at the same speed as sleeve 89 to provide a direct 1:1 drive ratio.

The reversing planetary gear set 61 comprises a plurality of planetary pinions 118 journaled on an output planet carrier 119 which is connected to the output shaft 69. Pinions 118 mesh with a ring gear 121 which may be restrained from rotation by a reverse brake 122 and with a sun gear 124 which is connected by a drum member 126 to the ring gear 71 of the torque multiplying and torque combining planetary gear set 59. When fluid is supplied by reverse line 123 to reverse motor 123' the reverse brake 122 is engaged to hold ring gear 121 stationary, the sun gear 64 transmits torque into the ring gear 71 through the pinions 66 with the output planet carrier 68 acting as a reaction member. The torque thus introduced into the drum member 126 by its connection to the ring gear 71 causes sun gear 124 to rotate in a direction opposite that of the converter output shaft 38 and since the ring gear 121 is held stationary, the pinions 118 orbit in the ring gear 121 in a direction opposite that of rotation of the converter output shaft 38 to drive through planet carrier 119 the output shaft 69 in the reverse direction to provide a reverse drive ratio.

The various brakes and clutches employed in the transmission diagrammatically shown in the drawing are actuated hydraulically by fluid actuated motors and have suitable retraction springs.

The sequence of operation will be described in the following operational summary.

The transmission drive train described above is used to provide six different forward drive ratios and a reverse drive ratio. The first forward drive ratio and the one considered the lowest, produces the greatest torque multiplication available in this drive train arrangement for high starting effort and occurs when the low low brake 72 in gear unit 19 is engaged to hold the ring gear 71 of the torque multiplying the torque combining planetary gear set 59. Then, with the converter output shaft 38 being driven forwardly by the torque converter 11, the output planet carrier 68 and thus the output shaft 69 will be driven at a reduced speed relative to the converter output shaft 38 which is determined by the low low drive ratio. In the first forward drive ratio, the direct drive or low clutch 84 in gear unit 16 is also engaged to control the rotational speeds of the elements in the gear units 16 and 18.

In the remaining forward drive ratios there is a dual power path to the torque multiplying and torque combining planetary gear unit 19.

To establish the second forward drive ratio, the low low brake 72 of gear unit 19 is disengaged to release the ring gear 71 of the torque multiplying and torque combining planetary gear set 59. The direct drive clutch 84 of gear unit 16 remains engaged to rotate the sun gear 92 of the low planetary gear set 58 at the same speed as the converter output shaft 38 and in the gear unit 18 the low brake 102 is engaged to hold the ring gear 101. With the sun gear 92 being driven at converter output shaft speed, the ring gear 71 of gear unit 19 is driven at the greatest reduction ratio provided by the combination of gear units 16 and 18 since gear unit 16 is conditioned for its splitter low drive ratio which is direct drive while gear unit 18 is in its lowest drive. The differential speed between sun gear 64 and ring gear 71 causes the pinions 66 to revolve about the sun gear 64 thus driving the planet carrier 68 and output shaft 69 in the forward direction and at a speed proportional to the differential speed. This combined drive provides the second forward drive ratio between the output shaft 69 and the converter output shaft 38 which is higher than the first forward drive ratio.

The third forward drive ratio employs low in the splitter unit and intermediate in the range unit. In gear unit 16, the direct drive or low clutch 84 remains engaged providing the splitter low direct drive ratio. The gear unit 18 is shifted for the intermediate drive ratio by the disengagement of the low brake 102 and the engagement of the intermediate brake 112. Thus a single transition shift to third is effected.

To establish the fourth forward drive ratio, gear unit 16 is altered by disengaging the direct drive clutch 84 and reengaging the overdrive brake 82 while the gear unit 18 remains in its intermediate drive ratio status. The combined reduction drive provided by the splitter high overdrive ratio of gear unit 16 and the intermediate drive ratio of gear unit 18 drives the ring gear 71 of gear unit 19 in the same direction as converter output shaft 38 and at a reduced speed. Since the sun gear 64 of gear unit 19 is rotating at converter output shaft speed, the relative speed difference between sun gear 64 and ring gear 71, which is smaller than that occurring in the third forward drive, determines the fourth forward drive ratio which is a higher drive ratio than the third forward drive ratio.

The fifth forward drive ratio which is a direct or 1:1 drive ratio between output shaft 69 and converter output shaft 38 requires a double transition shift to place both the gear unit 16 and the gear unit 18 in direct drive which requires that the direct drive clutch 84 of gear unit 16 and the direct drive clutch 114 of gear unit 18 be engaged. With direct drive clutches 84 and 114 engaged, the gear units 16 and 18 respectively are locked up and drive the ring gear 71 of gear unit 19 at converter output shaft speed.

The sixth forward drive ratio which is the highest drive ratio and an overdrive ratio is provided by altering the status of gear unit 16 by disengaging the direct drive clutch 84 and re-engaging the overdrive brake 82 while the direct drive clutch 114 in gear unit 18 remains engaged. With gear unit 18 effectively locked up by the direct drive clutch 114, the ring gear 71 of gear unit 19 is caused to rotate at a speed faster than the converter output shaft 38 and since the sun gear 64 is rotating at converter output shaft speed the pinions 66 are caused to revolve about the sun gear 64 to drive the planet carrier 68 and thus the output shaft 69 at a speed greater than the converter output shaft 38.

In neutral, the sun gear 64 of gear unit 19 is driven at converter output shaft speed and all drive establishing devices in gear units 18 and 19 are disengaged. The direct drive clutch 84 in gear unit 16 is engaged to control the rotational speed of the elements in gear units 16 and 18 and ring gear 71 rotates freely since the drive establishing devices in gear units 18 and 19 are disengaged.

To establish the reverse drive ratio, the reverse brake 122 in the reversing planetary gear unit 21 is engaged to hold the ring gear 121. The sun gear 64 of gear unit 19 which is rotating at converter output shaft speed transmits torque into the ring gear 71 through the pinions 66. The torque thus introduced into the drive connection 126 by ring gear 71 causes sun gear 124 to rotate in a direction opposite the direction of rotation of converter output shaft 38 and since the ring gear 121 is held stationary, the pinions 118 orbit in the ring gear 121 in a direction opposite that of rotation of converter output shaft 38 to drive through planet carrier 119 the output shaft 69 in the reverse direction. The direct drive clutch 84 in gear unit 16 is engaged to control rotational speeds of the elements in gear units 16 and 18.

CONTROLS

The three gear input driven gear pump 151 supplies fluid from an oil sump 152 through both the main feed line 153 and the converter feed line 154. The converter feed line has a relief valve or saftey blow off valve 154' to limit maximum pressure and is connected to supply the torque converter operating chamber in torque converter housing 26. The converter outlet line 155 has a pressure regulator valve 155' to control pressure in the operating chamber and overage is returned by line 155' to the sump. The feed line 153 is connected through bypass filter 157 to main line 158 which is regulated by the main regulator valve 156. The main regulator valve 156 has valve element 161 having lands $a$ and $b$ of equal diameter located in a bore 162. Main line pressure is always connected by line 158 to the space between lands $a$ and $b$ and by a check valve passage 163 through the land $b$ to the bore 162 between land $b$ and the wall 164 to act on the annular area of land $b$ to urge the valve from the closed position shown toward the exhaust position to connect main line 158 to overage line 166. The bore at the end of the valve around land $c$ is vented to exhaust 170. The spring 167 seated on a movable piston abutment 168 located in an enlarged bore portion 169 biases the valve 161 to the closed position shown. The spring chamber is vented by exhaust 171. The boost line 172 is connected to the closed end of the bore 169 and on the supply of pressure moves the piston 168 against the shoulder 173 to increase the spring bias and the main line pressure.

The overage line 166 is connected to a check valve 177 providing a moderate pressure differential between the lube line 166 and the converter line 154. The overage fluid is also connected through a restricted line 176 to supply lubricant to the gearing and keep pitot can 182 full. The check valve 177 has a plate 178 urged by suitable spring 179 to block flow from the overage line 166 to the converter feed line 154. Thus when the overage or lubrication feed pressure exceed the converter feed pressure by a moderate value the overage line is connected to assist feeding the converter.

A pitot governor 181 is mounted on the drum 116 driven at splitter gear output speed. The governor has an annular can 182 which is supplied by suitable jet feed from the lubrication system to keep the can full so that this annular mass of fluid impinges upon the open end of the pitot tube 183 and supplies to the governor line 184 a pressure proportional to splitter output shaft speed.

The lockup shift valve 186 has a valve element 187 having lands $a$ and $b$ located in a bore 188. With the valve in the downshift position shown the main line branch 189 is blocked by the land $a$ and the lockup feed line 191 is connected to the exhaust 192. When the governor pressure in line 184, which acts on the end of land $b$ reaches the value sufficient to overcome the opposing biasing force of the spring 193, the valve 187 upshifts to connect main line branch 189 to the lockup feed line 191 and blocks exhaust 192. The boost line 172' may be connected to the normal exhaust for spring chamber portion of the bore to block upshift of lockup valve element 187 in reverse, neutral, first and second.

The flow valve 196 has a valve element 197 having lands a, b and c in stepped bore 199. With this valve in the low flow position shown, lockup feed line 191 is connected to the lockup line 45 to negage the lockup clutch. The main line 158 is connected to the end of bore 199 to act on the end face of land c to urge the valve to the flow position and also connected through a resistriction 201 to the control feed line 202 which extends around land c. The control feed line 202 has a branch 203 directed through the restriction 204 in the plate 206 of check valve 207 to provide a slow feed to the other closed end of bore 199 to act on the large land a to overcome the smaller force of main line pressure on the land c and maintain or return the valve to the low flow position shown connecting lockup feed line 191 to lockup line 45 for lockup. The exhaust 209 vents the step in the bore between lands a and b. When a fluid motor is supplied with fluid there is flow from main line 158 through restriction 201 to control feed line 202 reducing pressure downstream of the restriction in line 202 and branch 203 opening check valve 207 to lower the pressure in the bore 199 acting on land a. The higher main line pressure acting on land c moves valve 197 quickly as check valve 207 is open against spring 208, to the flow position where the lockup feed line 191 is blocked and the lockup clutch line 45 is connected to exhaust 209 to disengage the lockup clutch.

Figure 3:
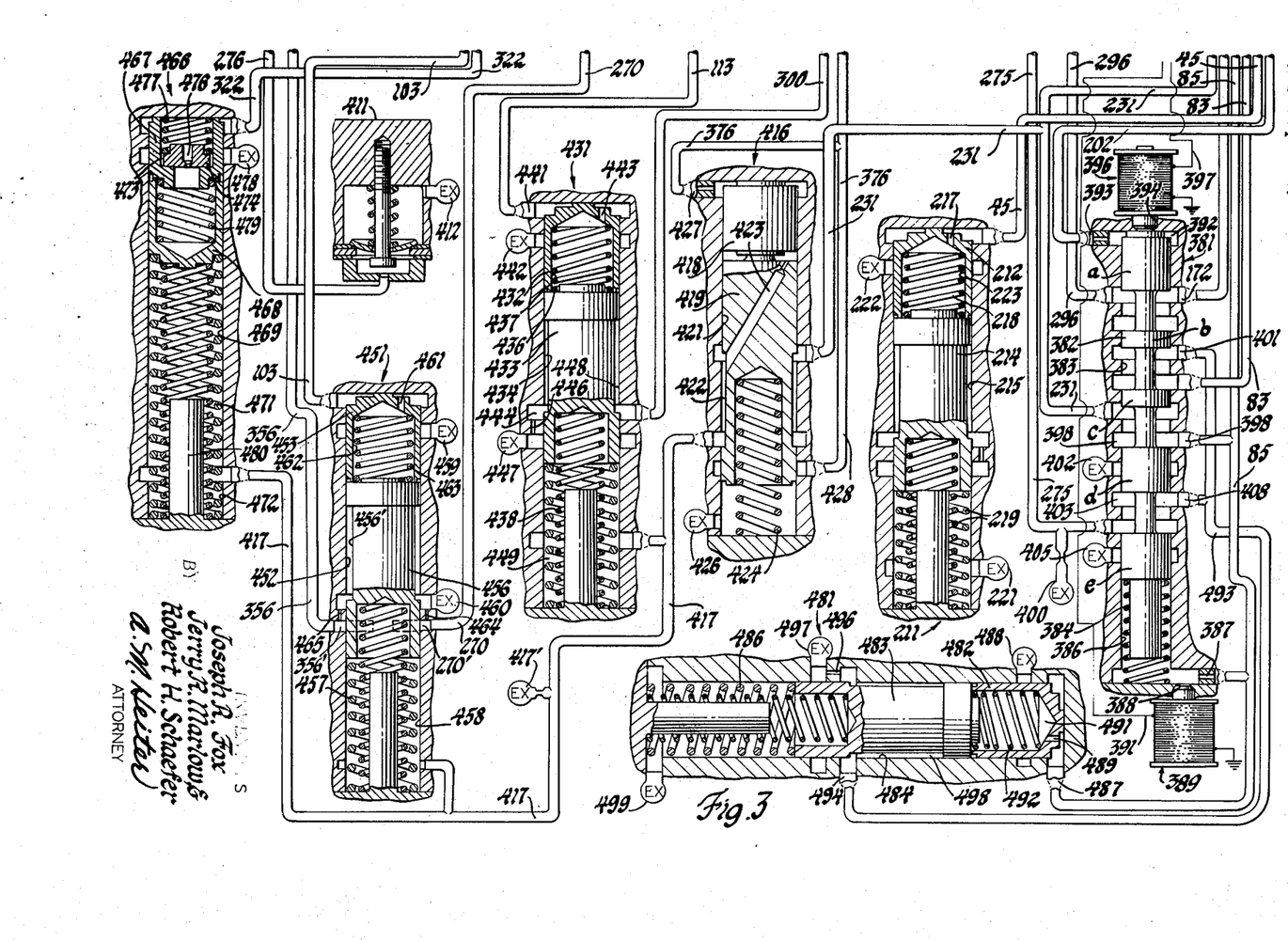

The lockup line 45 is also connected to the lockup trimmer valve 211, FIG. 3, which has a regulator valve 212 and a control plug 214 located in a bore 215. The lockup line 45 is connected to the end of bore 215 and passes through a restriction 217 to a chamber 218 within the valve 212 to provide a hydraulic equalizing pressure between the valve 212 and plug 214. Springs 219 between the end wall of the bore and plug 214 bias the plug and valve to the closed position shown. Exhaust 221 vents the spring chamber portion of the bore. On the supply of lockup pressure through lockup line 45 the fluid acts on the end of valve 212 and moves the valve and the plug 214 against the biasing force of spring 219 to exhaust excess fluid to exhaust 222 to reduce the pressure in the lockup line to a low initial value and during this period the fluid also flows through restriction 217 to chamber 218 to balance the pressure on opposite sides of the valve so that the spring 223 separates the valve from the plug, providing a longer valve assembly, to gradually increase the regulated pressure in the lockup line 45 at a rate controlled by flow through orifice 217 up to a higher pressure and then to main line pressure.

Figure 2:
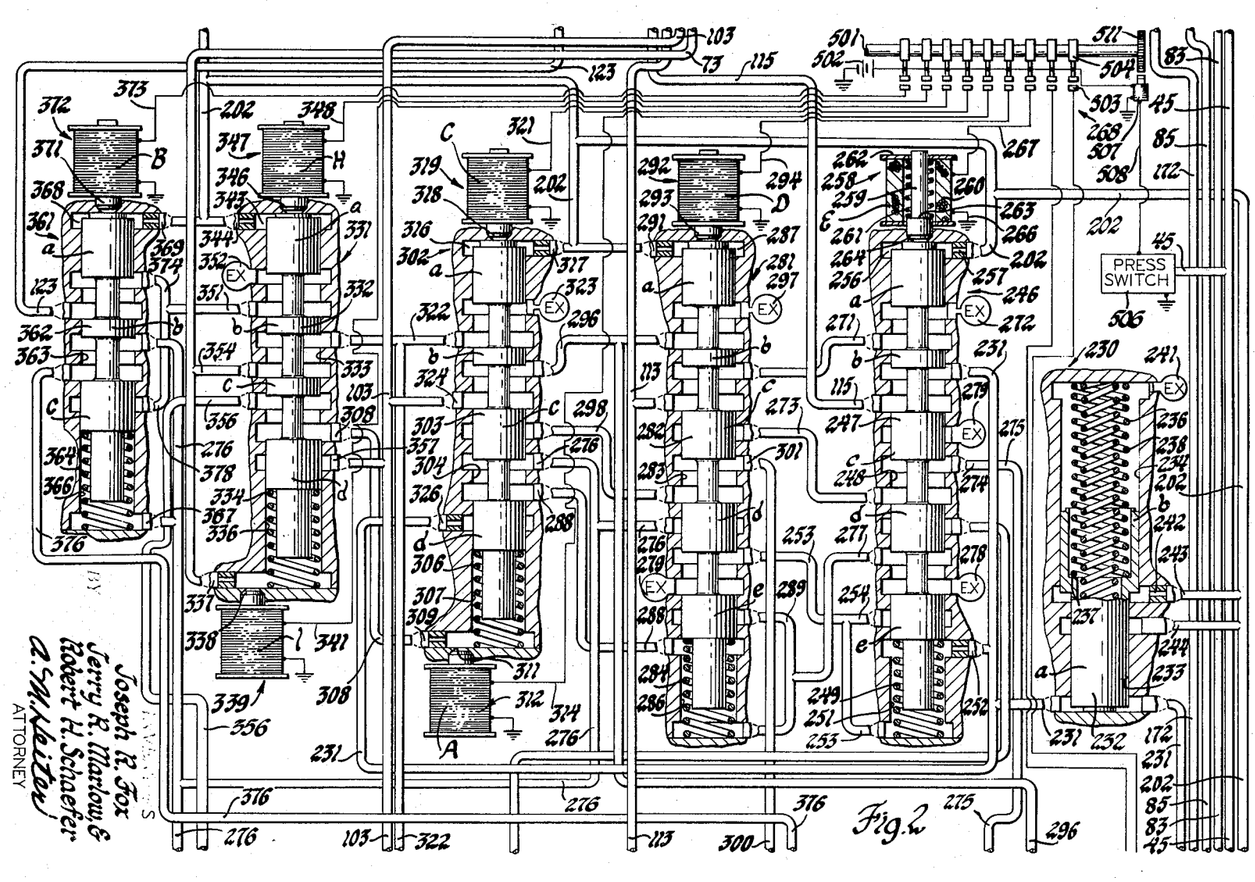

The main line pressure is also connected by control feed line 202 to a priority valve 230, FIG. 2, which in turn supplies the ratio feed line 231. The priority valve has a valve element 232 having a small land a in a small bore 233 and a large land b in a large bore 234. A short spring 236 is seated on the end of bore 234 and on a step 237 in the hollow valve element 232 adjacent the step between the lands. Within the short spring there is a long spring 238 also seated on the end of the bore and extending to the end of the hollow adjacent the remote end of land a. This spring arrangement provides sufficient force at a low spring rate. The bore 234 is vented by exhaust 241. The control feed line 202 is connected through branch 243 having restriction 242 to the step between bores to act on the unbalanced area of land b and when the proper control pressure is available for a sufficient time to downshift the range shift valves the valve element is raised to connect the control feed line 202 through a branch 244 and the bore 233 to the ratio feed line 231 at the end of the bore.

The high shift valve 246, FIG. 2, controls the high clutch 114 of the range gear unit 18 and has a valve element 247 having lands a, b, c, d and e of equal diameter located in a bore 248. The valve element is normally biased to the upshift or high position shown by a spring 249 located in the closed upshift chamber 251 at the lower end of the valve. When valve 247 is in the upshift position shown the ratio feed line 231 is connected by restricted branch 252 just below land e to chamber 251 to pressurize the chamber when high relief line 253 is blocked by the downshift intermediate valve 281 and the high relief line branch 254 is blocked by the land e of upshifted high valve 246. This chamber 251 is vented at its lower end by the high relief line 253 to exhaust 279 when the intermediate valve 281 is upshifted or by high relief line branch 254 to exhaust 278 when the high valve is in the downshift position. At the upper end of the valve the downshift chamber 256 is supplied by the restricted branch 257 from control feed line 202. The chamber 256 may be vented by energizing the solenoid controlled vent valve 258 which has a valve element 259 located within the cylindrical coil 260 and is biased by a spring 261 abutting the top plate 262 of the solenoid and the shoulder 263 on the valve element to normally urge the conical end land a into the conical vent aperture 264 at the end of the valve body to close and thus pressurize the chamber 256. The restriction 257 is small compared to vent 264 to reduce pressure in chamber 256 to a very low value so spring 239 upshifts the valve 247 and to limit loss of pressure in line 202 when solenoid vent valve 258 is open. The other restrictions in the feed to shift chambers have a similar small size. The solenoid has a suitable ground 266 and a lead 267 connected to the switch assembly 268 described below to energize and thus open valve 258 to exhaust chamber 256. The spring 249 holds the valve in the upshift position shown when both the upshift chamber 251 and the downshift chamber 256 are exhausted or filled and when only the upshift chamber 251 is filled. In the upshift position shown, the high valve connects the ratio feed line 231 between lands b and c to the high clutch line 115. The intermediate feed line 271 is connected between lands a and b to restricted exhaust 272. The intermediate exhaust line 273 is connected between lands c and d to exhaust 274 and controlled exhaust line 275. The controlled intermediate exhaust line 270 is blocked by land d. The intermediate release line 277 is connected to exhaust 278. When solenoid valve 258 is de-energized so spring 261 closes vent port 264 to pressurize downshift chamber 256 and up shift chamber 251 is vented by downshift of the intermediate valve 281, the high valve is downshifted, then the ratio feed line 231 is connected to intermediate feed line 271, high clutch line 115 is vented to exhaust 279, the intermediate exhaust line 273 is connected to controlled intermediate exhaust line 270, intermediate relief line 277 is blocked from exhaust 278, high relief branch 254 is connected to exhaust 278 and land e blocks restricted feed 252.

The intermediate shift valve 281 controls the intermediate range clutch 112. It is similar to the high shift valve and has a valve element 282 having lands a, b, c, d and e located in a bore 283. The valve element 282 is biased in an upshift direction by spring 284 located in and by fluid pressure in the upshift chamber 286, and biased in a downshift direction by fluid pressure in the downshift chamber 287 at the top of the valve. Fluid is supplied to the upshift chamber 286 by the intermediate hold line 288 connected to the top of this chamber, only when the intermediate shift valve is in the upshift position. Chamber 286 is pressurized when intermediate relief line 277 is blocked at the downshifted high shift valve and intermediate relief branch 289 is blocked by the upshifted intermediate shift valve. Fluid is released from the bottom of this chamber by the intermediate release line 277 when the high shift valve is upshifted to connect line 277 to exhaust 278 and by branch 289 when downshifted intermediate shift valve connects it to exhaust 279. The downshift chamber 287 is continuously supplied with fluid from control feed line 202 via the restricted branch 291 and the pressure in this chamber is controlled by the solenoid exhaust valve 292 which is structurally the same as solenoid exhaust valve 258 described above. Valve 292 is similarly spring biased to close the exhaust port 293 to pressurize chamber 287. On the supply of electricity from the manual switch 268 via electrical connection 294, the energized solenoid opens the valve to exhaust chamber 287. Intermediate shift valve element 282 will be in the upshift position under the bias of spring 284 when both upshift chamber 286 and downshift chamber 287 are either exhausted or filled, and when only upshift chamber 286 is filled. With the intermediate valve element 282 in the upshift position, the intermediate feed line 271 is connected to the intermediate clutch line 113, the low feed line 296 is connected to restricted exhaust 297, the intermediate exhaust line 273 is blocked by land c, the low exhaust line 298 is connected to controlled exhaust 301 and line 300, the low pressure exhaust line 276 is blocked by land d, the high release line 253 is connected to exhaust 279, the intermediate release branch 289 of the line 277 is blocked by land e. When solenoid valve 292 is de-energized and closed to pressure downshift chamber 287 and upshift chamber 286 is vented, the intermediate shift valve is downshifted.

With valve element 282 in the downshift position, restricted exhaust port 297 is blocked by land a, intermediate feed line 271 is connected to low feed line 296, intermediate clutch line 113 is connected to intermediate exhaust line 273, port 301 of controlled exhaust line 300 is blocked by land c, low exhaust line 298 is connected to low pressure exhaust line 276, high release line 253 is blocked by land d, intermediate release branch 289 is connected to exhaust 279 to vent upshift chamber 286 and intermediate hold line is blocked by land e.

The low shift valve 302 controls the low ratio brake 102. The valve element 303 has lands a, b, c and d located in a bore 304. The spring 306 and fluid pressure in the upshift chamber 307 bias the valve to the upshift position. The low release line 308 connected by restriction 309 to the upshift chamber 307 supplies fluid pressure to this chamber. The upshift chamber has an exhaust port 311 normally closed by a solenoid operated vent valve 312 similar to solenoid operated vent valve 258. The valve is opened to vent the chamber when current is supplied from manual switch 268 by conduit 314. At the upper end of the valve the downshift chamber 316 is supplied with main line pressure via controlled feed line 202 and restricted branch 317. The chamber also has an exhaust port 318 normally closed by the solenoid operated vent valve 319. When current is supplied from the manual switch 268 via conduit 321, the solenoid opens the valve to vent downshift chamber 316.

Valve element 303 is in the upshift position shown when both chambers are either filled or exhausted by spring 306 or under the bias of fluid in upshift chamber 307 only and the spring. In the upshift position, valve element 303 connects low low feed line 322 to restricted exhaust 323, the low brake line 103 via branch 324 to low feed line 296, the low exhaust line 298 is blocked by land c, the low pressure exhaust line 276 is connected to the intermediate hold line 288, and ratio feed line 231 connection via restriction 326 is blocked by land d.

The valve will be in the downshift position only when the downshift chamber 316 is filled and the upshift chamber is exhausted. In this position, land a blocks exhaust 323, low feed line 296 is connected to the low low feed line 322, low brake line 103 is connected by branch 324 to the low exhaust line 298, low pressure exhaust line 276 is blocked by land c and ratio feed line 231 is connected through restriction 326 to intermediate hold line 288.

The low low shift valve 331 has a valve element 332 having lands a, b, c and d located in bore 333. The valve element is biased to the upshift position by spring 334 in the lower end of the bore acting on land d and by fluid pressure in the upshift chamber 336. The low low line 73 has a restricted branch 337 connected to supply fluid to the upshift chamber 336. The upshift chamber 336 is pressurized when exhaust 338 is normally closed by the normally closed spring biased solenoid valve 339 which is like solenoid valve 258. When the manual switch 268 supplies electric current via conduit 341 to solenoid 339, the valve opens exhaust 338 to exhaust chamber 336. At the upper end of the low low shift valve 331 there is a downshift chamber 343 which is supplied with fluid from main line 202 via restricted branch 344 and provides downshift force when exhaust 346 is closed by the normally closed spring biased solenoid valve 347 like solenoid valve 258. Solenoid valve 347 is opened to exhaust the downshift chamber when the manual switch 268 supplies current through conduit 348.

The low low valve element 332 is in the upshift position when both the upshift and downshift chambers are either exhausted or filled due to the action of spring 334 or when only the chamber 336 is filled. When valve element 332 is in the upshift position, the reverse feed line 351 is connected to exhaust 352, low low feed line 322 is connected to branch 354 of the low low line 734, low low controlled exhaust line 356 is connected to the low release line 308 and low clutch line 103 has a branch 357 blocked by land d. The low low valve element 332 is moved to the downshift position when pressure is only in downshift chamber 343. Then exhaust 352 is blocked by land a, reverse feed line 351 is connected to the low low feed line 322, branch 354 of low low line 73 is connected to the low low controlled exhaust line 356 for control at trimmer valve 451 and low line 103 is connected via branch 357 to the low relief line 308.

The reverse shift valve 361 for establishing reverse drive has a valve element 362 having lands a, b and c located in the bore 363 and has a spring 364 in an upshift chamber 366 for biasing the valve to the upshift position. The upshift chamber 366 is connected directly to exhaust or to the low pressure exhaust line 276 by branch 367. The downshift chamber 368 at the upper end of the bore is supplied by fluid from main line 202 by restricted branch 369 to downshift the reverse shift valve when the exhaust passage 371 is closed by the spring biased solenoid valve 372 which is structurally like solenoid valve 258. When the manual switch 268 supplies current via line 373 to the solenoid valve, the valve is opened to vent chamber 368 permittting the spring 364 to upshift the valve.

Reverse valve element 362 in the upshift position shown connects reverse feed line 351 via branch 374 to the reverse line 123 and low pressure exhaust line 276 is connected to the neutral trimmer boost line 376.

When solenoid valve 372 is closed, the fluid supplied from main line 202 by restricted passage 369 pressurizes chamber 361 to downshift valve element 362. With the reverse valve in the downshift position, reverse feed line branch 374 is blocked by land a and reverse line 123 is connected to the low pressure exhaust line 276 and the reverse feed line 351 via branch 378 is connected to the neutral trimmer boost line 376.

The splitter shift valve 381, FIG. 3, controls the low ratio direct drive splitter clutch 84 and the high ratio overdrive splitter brake 82 and has a valve element 382 having lands a, b, c, d and e located in a bore 383. At the lower end of the valve a spring 384 engages land e and biases the valve upwardly in the drawing to low or downshift position. The splitter low line 85 supplies fluid through restriction 387 to the downshift chamber 386 to provide a hydraulic force to downshift the valve, when the exhaust port 388 is closed by a normally closed spring biased solenoid valve 389 which is like solenoid valve 258. When the manual switch 268 supplies current via conduit 391 to the solenoid valve 389, the vent 388 is opened to exhaust chamber 386. At the upper end of the valve the upshift chamber 392 is supplied with fluid from the feed line 202 via the restricted branch 393 to provide a biasing force to upshift the splitter valve when the exhaust port 394 is normally closed by the spring closed solenoid valve 396 which is like solenoid valve 258. When the manual switch 268 supplies fluid via conduit 397 the solenoid is actuated to open exhaust 394 to vent chamber 392.

The valve is biased upwardly on the drawing to the downshift shift position by spring 384 when both the upshift and downshift chambers are both either filled or exhausted, and when only the downshift chamber 386 is filled. The splitter shift valve 381 in the downshift position shown connects ratio feed line 231 to the splitter low port 398 and line 85 to engage splitter low and connects splitter high line 83 to exhaust 401. Controlled exhaust line 275 has a calibrating orifice 400 and is connected by downshifted splitter valve 381 to port 403 of splitter exhaust control line 493. When only upshift chamber 392 is pressurized, the valve 381 is in the upshift position connecting ratio feed line 231 to the splitter high line 83 and connects splitter low line 85 via port 398 to exhaust 402. Exhausts 401 and 403 of splitter controlled exhaust line 493 are blocked. Controlled exhaust line 275 is connected to free exhaust 405. In both valve positions, the neutral trimmer boost line 296 is connected to the main line boost line 172 to control main line regulator valve 156. Exhausts 401 and 403 are connected to controlled exhaust line 493 connected to the splitter trimmer valve 481.

The low pressure relief valve 411 is connected to the low pressure exhaust line 276 to connect this line to exhaust 412 to maintain and limit the pressure in line 276 to a very low value, i.e., 1 p.s.i.

Neutral trimmer boost valve 416 supplies a controlled trimmer boost pressure to the trimmer boost pressure or actuator line 417 which controls the low low and reverse 466, low 451 and intermediate trimmer valves. This valve 416 has a plug 418 and a regulating valve element 419 located in a bore 421. The valve element 419 has a groove 422 which is connected by a restricted passage 423 to the end of the valve element and the space between the valve element and the plug 418. The spring 424 in the bore at the end vented by exhaust 426 biases the valve to the regulating position shown where the ratio feed line 231 is connected through the groove 422 to the trimmer actuator line 417 and via passage 423 to the space between the valve element and plug to regulate the pressure at a low value, i.e., 30 p.s.i., supplied to the trimmer actuator line 417. The neutral trimmer boost line 376 is connected by a restrictive branch 427 to the upper closed end of the bore 421 to act on the plug 418 and by port 428 to the lower portion of the bore where it is blocked by the valve element in the regulating position. When the transmission control system is in any position other than neutral the trimmer boost line 376 is exhausted and this valve regulates the trimmer boost or actuator pressure in line 417 at a low value by admitting line pressure from ratio feed line 231 or exhausting fluid to port 428 of exhausted line 376.

In neutral, when the neutral trimmer boost line 376 is pressurized via reverse valve 361 this pressure is supplied by restriction 427 to the upper end of the bore to act on the end of plug 418 and moves the plug 418 and valve element 419 completely down to a connecting position directly connecting main line pressure from the trimmer boost line 376 and port 428 to trimmer actuator line 417 to provide main line pressure in the actuator line in neutral to reset and hold trimmer valves 431, 451 and 466 ready for trimming on a shift from neutral. On a shift from neutral to any ratio neutral boost line 376 is exhausted by any upshifted range valve and exhausts the trimmer boost line 417 for the time required for plug 418 to expel fluid from bore 422 through restriction 427 to return valve 416 to the regulating position. During this time, because there is no pressure in line 417 a lower initially regulated low pressure will be provided by low low and reverse 466, low 451 and intermediate 431 trimmer valves during the time they regulate engagement of these respective ratios on a shift from neutral. On a shift to these ratios from other ratios they will be supplied with regulated boost pressure from line 417 and provide a higher initially regulated trimmed pressure.

The intermediate trimmer valve 431 trims the pressure supplied to the intermediate clutch 112. The valve 431 has a regulating valve element 432 and a valve plug 433 located in a bore 434. A light spring 436 is located in a cavity 437 in the regulating valve 432 and engages the plug 433. A heavier and preferably dual spring 438 biases the plug 433 and regulating element 432 to the closed position shown where the valve assembly is ready to initiate a regulating cycle. On the supply of fluid to line 113 to engage the intermediate clutch 112, this pressure is supplied by port 441 to the end of bore 434 where it acts to move the regulating valve and the plug downwardly against the basing force of spring 438 to initially regulate the apply pressure at a low value and vent excess fluid to exhaust 442. During this regulation, fluid also flows through the restriction 443 to the space between the regulating element and the plug to permit the spring 436 to separate these elements to effect an increase in the length of the valve assembly and thus increase the biasing force of spring 438 on the assembly to gradually increase the pressure to a high value, preferably main line pressure. The controlled exhaust line 300 is connected by a port 444 and restriction 446 to exhaust 447 when the valve is in the initial position shown and during some initial movement such as to initial regulation while the regulating element 432 and the valve plug 433 are not significantly separated. However, when time has elapsed for the fluid flow through restriction 441 to move the valve assembly and perhaps also through restriction 443 to partially separate the regulating element 432 and the plug 433, and thus provide some degree of intermediate engaging pressure to take up a proper degree of slack or load, the groove 448 is moved down sufficiently to connect port 444 directly to exhaust 447 for a free exhaust. The location of the lower edge of groove 448 on the plug 433 and exhaust 447 determines the point on the gradual pressure increase curve of this trimmer valve at which the high exhaust is changed from a restricted exhaust to a free exhaust to control the degree of overlap in timed relation with the increasing trimmed intermediate pressure in line 113. The trimmer boost pressure line 417, which is connected to the closed spring chamber 449 at the lower end of this valve, provides no pressure on a shift from neutral to intermediate, so the initial and increasing trimmed pressure is lower than during normal operation. During normal operation, which is a shift from any other ratio to intermediate, trimmer boost pressure from line 417 provides an additional biasing force proportional to the boost pressure providing a higher initial and increasing intermediate apply pressure. In neutral, trimmer boost line 417 provides a main line pressure to quickly reset the trimmer valve to the initial position shown in which it is ready for a new cycle.

The low trimmer valve 451 regulates the pressure supplied to low line 103 to provide an initial low pressure and a gradual increase to main line pressure. The low pressure in line 103 is connected to the upper closed end of the bore 452 and acts on the regulating element 453 and the plug 456 acting and moving as a unit against the bias of a dual spring 457 and the pressure supplied by the trimmer boost line 417 to the closed spring chamber 458. Initially the pressure is regulated at a low value and low line 103 is connected to exhaust 459. During regulation fluid also flows through restricted passage 461 to the chamber 462 to permit the spring 463 to separate the regulating valve and plug 456 so that the spring biasing force increases to gradually increase the pressure regulated in line 103.

Low trimmer valve 451 provides exhaust control for low low on an upshift to low and for intermediate on a downshift to low in the range unit. Intermediate exhaust via high valve 246 and controlled exhaust line 270 is connected to semicircular port 270' which in the reset position shown of low trimmer valve 451 is only connected by restriction 464 to free exhaust 460. Low low controlled exhaust line 356 is connected to semicircular port 356' which is also only connected by restriction 465 to free exhaust 460. When there is sufficient low apply pressure from line 103 to move valve 453 and plug 456 so groove 456' freely connects both lines and ports 270–270' and 356–356' to free exhaust 460. As explained above for intermediate trimmer valve 431 the groove 456' and ports 270' and 356' are located to restrict low low and intermediate exhaust to delay pressure decay until there is a predetermined low apply pressure and then these exhausts are free.

The low low and reverse trimmer valve 466 regulates the pressure of the low low feed line 322 which supplies pressure for both engagement of low low and reverse. The valve assembly has a regulator valve element 467 and a plug 468 located in a bore 469. The plug and regulating element are both biased to the closed position shown by the dual spring 471 and the trimmer boost pressure which is connected by line 417 to the closed chamber portion 472 to act on the end of plug 468 to bias the plug and valve 467 assembly to the closed position shown. Valve element 467 has stepped central passage 473 which is normally restricted by a check valve plate 474 having a restricted passage 476 therethrough. The spring 477 located in bore 473 abuts the end of the valve body and biases the valve plate 474 to the closed position. Upon the initiation of the supply of fluid to either the low low or reverse engaging motor the line 322 is initially supplied with fluid which is connected to the end of bore 469 to act on the regulating valve element 467 and to move the regulating valve element and the plug 468 against the bias of spring 471 on shifts from neutral to reverse and low low and also the bias of pressure supplied by line 417 on a downshift to range low low to exhaust excess fluid to exhaust 478 to regulate the pressure in line 322. On a shift from neutral to either reverse or low low, the range unit trimmer boost line 417 is exhausted through neutral boost line 376 for the time period in which the plug 418 and element 419 of the neutral trimmer boost valve 416 requires to return to the regulating position shown. The time period is controlled by the size of restriction 427 and the time preferably as long as the gradual pressure increase period of the low low and reverse trimmer valve 466. During this regulation fluid flows through restriction 476 to the space in the hollow interior 479 of plug 468 and between the regulating element and the plug permitting spring 479 to separate them to increase the spring bias to gradually increase the regulated pressure in line 322. When plug 468 abuts stop 480 pressure in line 322 rises to line pressure. When the transmission is in neutral pressure remains in line 322. Main line pressure is also supplied by line 417 to the lower side of plug 468 to balance the pressure on the other side of the plug 468 between the plug and regulating valve element and the spring 471 returns the plug to the position shown in contact with the regulating element 467 at a rapid rate since check valve plate 474 opens permitting unrestricted flow from the space between the plug and valve element 467 to line 322 to quickly reset trimmer valve 466.

The splitter low trimmer valve 481 has a regulator valve 482 and a plug 483 located in a bore 484 and biased by dual spring 486 to the closed position shown. The splitter low apply line 85 is connected by port 487 to the closed end of the bore and acts on valve 482 to move the valve and plug against the spring bias to open exhaust to regulate splitter low pressure at an initial low value. This pressure also flows through restriction 489 to the space 491 between the valve and plug so spring 492 separates them to gradually increase the bias and splitter low apply pressure. The splitter high exhaust line 493 is connected to port 494 and via restriction 496 to free exhaust 497 when the valve 481 is in the closed position shown to restrict exhaust at the initiation of low apply. At an intermediate apply pressure during a splitter low engagement port 494 is directly connected by groove 498 to exhaust 497 to provide a free exhaust and quick release of splitter high. The spring chamber end of bore 484 is vented by exhaust 499.

On a 4th to 5th ratio shift intermediate exhaust via controlled exhaust line 275 and splitter valve 381 and port 403 is with high exhaust connected to low controlled exhaust line 493 to increase delay on this double transition shift as compared to the above single transition shift.

The manual switch 268, FIG. 2, has a suitable control element such as shaft 501 rotatably mounted on a suitable housing for movement to positions for reverse R, neutral N and first through sixth ratios. A suitable grounded source of current 502 is connected to each of a plurality of switches 503, shown in the open position, which are actuated by suitable cams 504 on the shaft 501 to close selected switches in each of the aforesaid positions to supply electric current via the designated conduit to actuate the designated solenoid valve in each of the positions as indicated by the table below.

| Tr. Ra. | Ra. GU | Sp. GU | SpL 397 396 | SpH 391 389 | R 373 372 | N 314 312 | UL 341 339 | LL 348 347 | Lo 321 319 | I 294 292 | H 267 258 | SP 381 | R 361 | LL 331 | Lo 302 | I 281 | H 246 |
|---|---|---|---|---|---|---|---|---|---|---|---|---|---|---|---|---|---|
| 6 | H | H |   | X |   |   |   |   |   |   | X | Up | D | D | D | D | Up |
| 5 | H | L | X |   |   |   |   |   |   |   | X | D | D | D | D | D | Up |
| 4 | I | H |   | X |   |   |   |   |   | X |   | Up | D | D | D | Up | D |
| 3 | I | L | X |   |   |   |   |   |   | X |   | D | D | D | D | Up | D |
| 2 | Lo | L | X |   |   |   |   |   | X |   |   | D | D | D | Up | D | D |
| 1 | LL | L | X |   |   |   |   | X |   |   |   | D | D | Up | D | D | D |
| N | N | L | X |   |   | X | X |   |   |   |   | D | D | D | D | D | D |
| R | R | L | X |   | X | X | X |   |   |   |   | D | Up | D | D | D | D |

The above table, in the columns reading from the right shows in the first three ratio columns the transmission ratios (Tr. Ra.) available and the positions of manual switch 268, the ratio established in the range gear unit (Ra. GU) and the ratio established in the splitter gear unit (Sp. GU) in each manual switch position. In the range column H, I, Lo, LL, N and R indicate range high, intermediate, low, low low, neutral and reverse respectively. In the splitter column H and L indicate splitter high and splitter low respectively. The next line columns identify the conductors and solenoids respectively and indicate the ratio engaged or unlatched, splitter low (SpL), splitter high (SpH), reverse (R) neutral (N) which unlatches low low, low unlatching (UL), low low (LL) low (Lo), intermediate (I) and high (H). Under shift valves the last six columns indicate the names splitter (SP), reverse (R), low low (LL), low (Lo), intermediate (I) and high (H) with the respective reference numerals and whether the valve is upshifted (Up), providing the higher ratio, or downshifted (D), providing no or a lower ratio, in each overall transmission ratio.

A shift inhibitor prevents manual downshift movement of the manual switch when the lockup clutch is engaged.

When sufficient pressure is present in lockup line 45 to engage the lockup clutch, this pressure closes grounded pressure actuated switch 506 to complete a circuit from battery 502 through pawl solenoid 507 and conductor 508 to actuate the pawl solenoid. The pawl solenoid has a pawl plunger which is normally spring biased to the retracted position shown and when energized moves the pawl plunger to engage the ratchet wheel 511 which has one way ratchet teeth preventing switch movement and rotation of shaft 501 in the downshift direction. This prevents a manual downshift when the lockup shift valve 186 is upshifted but will permit an emergency downshift by first initiating an upshift, because during an upshift engagement while the low valve 196 is in the flow position the solenoid pawl is released for emergency downshifting.

OPERATION OF CONTROL SYSTEM

Figure 1:
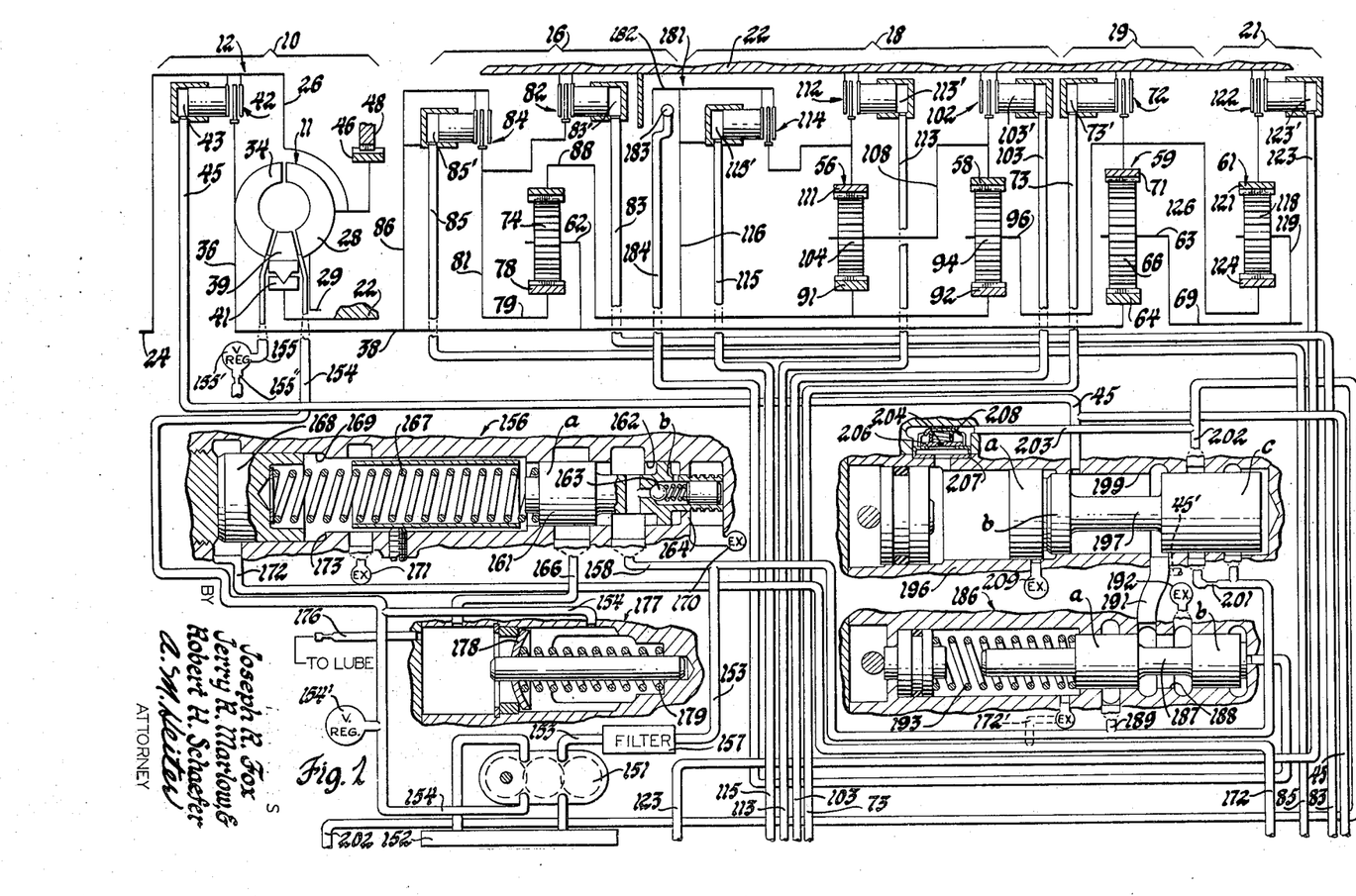
FIGURES 1, 2 and 3 of the drawing when arranged horizontally in that order diagrammatically show the invention.

When the torque converter housing 11, FIG. 1, is driven by the engine or the load, three gear pump 151, FIG. 1, supplies fluid via one pump outlet line 153 to the main line 158. The pressure in the main line 158 is regulated by the main line regulator valve 156 at a normal value in 3rd to 6th ratios and at an increased pressure when the pressure boost line 172 is supplied through the splitter shift valve 381, FIG. 3, in all positions in reverse, neutral, first and second ratios. The excess fluid from the main line regulator valve is connected via overage in line 166 through check valve 178 to the converter supply line 154 which is also supplied by another outlet of pump 151 and supplies the torque converter operating chamber. The main line 158 is connected through restriction 201 and if sufficient flow is required to fill the system supplied by control feed line 202, the cutoff valve 196 moves to cutoff position also directly connecting main line 158 to line 202 to supply the control feed line with main line pressure. The control feed line 202 is connected to the priority valve 230, FIG. 2, which remains in the closed position shown until main line pressure in line 202 and acting on the differential area between lands a and b reaches an intermediate value overcoming springs 236–238 moving valve 232 and restriction 242 timing the stroke to open the priority valve connecting control feed line 202 to ratio feed line 231. Thus the priority valve is only open after control feed line 202 has provided sufficient pressure for a sufficient time to downshift the range shift valves in accordance with the electric signals. With the priority valve in the open position, the main line pressure, now in line 231, acts on the end of land a so the valve will remain opened as long as a predetermined lower pressure value is maintained in the system. The predetermined lower pressure is, however, sufficient for proper operation of the transmission and control system. Thus this valve prevents abnormally low pressure operation of the system which could permit slipping of the ratio establishing friction devices.

Before the engine drives the pump 151 to provide main line pressure each shift valve is held by its spring in the upper position as shown, which is the upshift position for all range unit shift valves; reverse 361, low low 331, low 302, intermediate 281 and high 246 and the downshift position for splitter shift valve 381.

In the neutral position of the manual control, FIG. 2, the manual control 268 supplies current via lines 314 and 341, respectively, to solenoid valves 312 and 339 to vent the upshift chambers 307 and 336 of the low shift valve 302 and the low low shift valve 331. The manual switch also supplies current via conductor 397 to solenoid valve 396 to vent the upshift chamber 392 of the splitter shift valve 381. The control feed line 202 also supplies main line pressure through the respective orifices to each of the downshift chambers 368, 343, 316, 287 and 256 and with the solenoid valves 372, 347, 319, 292 and 258 in the spring biased position, this pressure in the absence of any upshift pressure respectively shifts all range unit shift valves; reverse shift valve 361, low low shift valve 331, low shift valve 302, intermediate shift valve 281 and high shift valve 246 to the downshift position. Since the priority valve 230 insures sufficient pressure in control feed line 202 connected to the range unit shift valve downshift chambers before supplying pressure to the ratio feed line 231 connected to the upshift chambers, all range unit shift valves are downshifted so all range upshift chamber and ratio motors are exhausted in neutral. The reverse line 123 is connected by the downshifted reverse shift valve 361 and the reverse valves upshift chamber 366 is directly connected to the low pressure exhaust line 276. The low low line 73 is connected through the downshifted low low valve 331 to low low controlled exhaust line 356 to exhaust at trimmer valve 451. The low line 103 is primarily exhausted via low valve 302; low exhaust line 298, intermediate valve 281 and the low pressure exhaust line 276. The low line 103 is also exhausted via branch 357, low low valve 331, low low valve 331, low release line 308, the low valve upshift chamber 307 through open solenoid valve 312. Intermediate line 113 is exhausted via intermediate valve 281, intermediate exhaust line 273, high valve 246 to low pressure exhaust line 276. High line 115 is connected by high shift valve 246 to exhaust 279. Thus all drives in the range unit are disengaged. The restriction 309 in low line 103 and restriction 337 in low low line 73 are small, like restriction 257, to enable solenoids 312 and 339 when open to exhaust chambers 307 and 336 while pressure is in lines 103 and 73. Ratio feed line 231 is connected via high valve 246, the intermediate feed line 271, intermediate valve 281, low feed line 296, low valve 302, low low feed line 322, low low valve 331, reverse feed line 351, the reverse valve 361 where the reverse feed branch 374 is blocked but the boost feed branch 378 is connected by the reverse valve to the neutral trimmer boost line 376. The ratio feed line 231 is also connected through restriction 326, low valve 302 and the intermediate hold line 288 to the intermediate valve 281 where it is blocked by land e and via branch 252 to the high valve 246 where it is blocked by land e and thus does not pressurize any upshift chamber. The intermediate valve upshift chamber 286 is connected by intermediate release line 277, branch 289 and intermediate valve 281 to exhaust 279. The high valve upshift chamber 251 is connected by high release line 253, branch 254 and high valve 246 to exhaust 278. Energized solenoids 339 and 312 vent low low 336 and low 307 upshift chambers of the respective valves. Since the range shift valve downshift chambers are pressurized and the range valve upshift chambers are exhausted, all the range shift valves are in the downshift position in neutral and all the range ratio engaging devices are exhausted and disengaged for neutral.

The neutral trimmer boost line 376 in neutral only acts on the trimmer regulator valve 416 to depress the regulator valve and connect main line pressure directly to the low low and reverse 466, the low 451 and the intermediate 431 trimmer valves to position these valves as shown for the initiation of a trim cycle.

The splitter shift valve 381, FIG. 3, with the upshift chamber 392 though supplied by control feed line 202 via restriction 393 exhausted by energized solenoid valve 396 and the downshift chamber 386 not initially supplied is held in the downshift position, shown, by the spring 384 to connect ratio feed line 231 to the splitter low line 85 which engages splitter low under trimming regulation by splitter low trimmer valve 481 and also fills the downshift chamber 386 to hold the splitter shift valve in a downshift position. Low feed line 296 is also connected by the splitter low valve in either position to boost line 172 to boost main line pressure.

When the manual switch is moved to reverse position, the control system remains the same as described above for neutral except for the following changes. The manual switch 268 in addition supplies current to line 373 to actuate solenoid valve 372 to vent the downshift chamber 368 to permit spring 364 to upshift reverse valve 361 to the reverse position connecting reverse feed line 351 and branch 374 through the valve to reverse line 123 to engage the reverse brake 122 to establish reverse overall transmission drive. The splitter low remains engaged as described above in neutral but does not drive. The reverse valve 361 also connects the neutral trimmer boost line 376 to the low pressure exhaust line 276. On the exhaust of neutral trimmer boost line 376 the neutral trimmer boost valve 416, as explained above, exhausts boost line 417 for a lower initial pressure in the trim cycle on a neutral to reverse shift and then connects ratio feed line 231 to the trimmer boost line 417 and regulates the pressure therein at a low regulated pressure permitting normal operation of the low low and reverse trimmer valve 466 which initially provides in line 322 a higher initial low pressure which is gradually increased for soft brake engagement for use on downshifts to low low as explained below.

When the manual switch 268 is moved from reverse to neutral position, the above described valve positions for the neutral condition are established and the reverse line 123 is connected to the low pressure exhaust line 276.

When the manual switch is moved from neutral to first ratio position, the solenoid valve 347 is energized to vent the downshift chamber 343 of the low low valve 331 to permit this valve to be upshifted by the spring 334. The upshifted low low valve 331 connects the low low feed line 322 via the low low branch 354 to low low line 73 to engage the low low brake 72 and establish first ratio drive. The solenoid valve 339 is de-energized to close vent 338 so the low low apply pressure in line 73 feeds through restriction 337 and fills upshift chamber 336 to hold low low valve 331 in upshifted position. The neutral trimmer boost line 376 is connected through the reverse line branch 378 and line 351 to exhaust 352 at the low low valve 331 so the neutral trimmer boost valve 416 discontinues the supply of main line pressure and provides a regulated low pressure supply in line 417 to the trimmer valves. Reverse line 123 remains connected by reverse valve 361 to the low pressure exhaust line 276. The solenoid 396 remains energized as in neutral so the splitter shift valve 381 supplies main line pressure to the splitter low line 85 and exhausts the splitter high line 83. Low in the splitter is engaged but is not part of the drive. Low in the splitter is engaged but there is no drive because the other shift valves remain in the downshift position, as described above for neutral, exhausting low line 103, intermediate line 113 and high line 115 to disengage these drives. On downshift from first ratio, the low low valve 331 downshifts to the above described neutral position in which low low line 73 is connected via branch 354 and valve 331 to the low low controlled exhaust line 356 and line 276.

On a shift of the manual switch 268 from first to second ratio position, solenoid 347 is de-energized; solenoid 319 energized and solenoid 396 remains energized. The other solenoids remain de-energized as in 1st ratio. De-energization of solenoid 347 to close vent valve 346 and fill downshift chamber 343 does not downshift low low shift valve 331 as long as there is pressure in low low line 73 which fills the upshift chamber 336. The opening of solenoid valve 319 exhausts downshift chamber 316 of the low valve 302 permitting the spring 306 to upshift the valve, disconnecting low clutch branch 324 and line 103 from low exhaust line 298 and connecting the low feed line 296 to the low clutch branch 324 and line 103 to supply fluid to initiate engagement of the low clutch. Reverse line 123 remains as in neutral and 1st ratio connected by reverse valve 361 to low pressure exhaust line 276. Neutral trimmer boost line 376, as in 1st ratio is connected by low low shift valve 331 to exhaust 352. The low low feed line 322 is connected by the upshifted low valve 302 to restricted exhaust 323 which via upshifted low low shift valve 331 and branch 354 exhausts low low line 73 to disengage the low low brake 72 and the pressure in downshift chamber 336 to downshift the low low shift valve 331 in timed relationship to the decay of low low pressure in line 73 under the control of restricted exhaust 323. When the low valve is downshifted the exhaust of the neutral trimmer boost line 376 is connected via downshifted reverse valve 361, branch 378 and reverse feed line 351, downshifted low low valve 331, low low feed line 322 and low valve 302 to exhaust 323. The low low line 73 is exhausted at low low valve 331 to low low controlled exhaust line 356 which is restricted by trimmer valve 451 until this valve initiates the cycle in which it regulates low apply pressure in line 103. Splitter shift valve 381 remains in the downshift position and engages splitter low as described above in neutral and 1st ratio so that the low ratio in the range gearing, second ratio drive is provided. After low low shift valve 331 is downshifted, low line 103 is connected by branch 357 through downshifted low low valve 331, low release line 308, restriction 309 to upshift chamber 307 of the low valve 302, and since the solenoid valve 312 is closed, so the pressure also holds low valve 302 upshifted. Reverse line 123, intermediate line 113 and high line 115 remain exhausted through their respective valves in neutral. The low line 103 is also connected to the low trimmer valve 451, which functions as described above to provide an initial low engagement pressure which is gradually increased for a smooth shift. On this 1st to 2nd ratio shift boost line 417 has the pressure regulated by trimmer boost valve 416 so trimmer valve 451 provides the higher initial low pressure for the trim cycle. On a neutral to 2nd ratio shift the final valve position described above for 1st to 2nd shift is directly obtained except that the trimmer line 417 is exhausted by the trimmer boost valve 416 and the neutral trimmer boost line 376 so the lower initial pressure is provided by trimmer valve 451 to regulate engagement of low. The upshift of the low valve 302 disconnects ratio feed line 231 supply via restriction 326 and this valve to intermediate hold line 288 and connects this line to low pressure exhaust line 276 to condition the intermediate shift valve 281 for an upshift.

On a 2–1 downshift, the above described low low ratio condition is re-established. Initially though solenoid 319 is de-energized and downshift chamber 316 is filled the upshift chamber 307 is also filled and with spring 306 holds low valve 302 upshifted. Solenoid 347 is simultaneously energized to exhaust downshift chamber 343 and spring 334 upshifts the low low valve 331 but low low engagement is not initiated since low low feed line 322 is connected to restricted exhaust 323 at the low valve 302. However low release line 308 is disconnected by low low valve 331 from low line branch 357 and connected to low low controlled pressure exhaust line 356 to exhaust upshift chamber 307 through restriction 309 to permit pressure in downshift chamber 316 to downshift low valve 302 to connect low feed line 296 to low low feed line 322 to establish low low as in 1st ratio. The low line 103 is connected by branch 324 and the upshifted low shift valve 302 to the low exhaust line 298 which is connected through the downshifted intermediate shift valve 281 to the branch 276 of the low pressure exhaust line 276 to disengage low.

The unlocking solenoid 312 makes it possible to have a 2nd to neutral shift by venting upshift chamber 307 to permit downshift of low valve 302 while the low valve 331 is downshifted but otherwise as on a 2nd to 1st shift.

On shift from the second to the third ratio position the manual switch 268 de-energizes solenoid 319, energizes solenoid 292 and solenoid 396 remains energized. The other solenoids remain de-energized. Energizing solenoid 292 vents downshift chamber 287 of the intermediate valve 281 permitting spring 284 to upshift the valve to connect the intermediate feed line 271 to the intermediate line 113 to engage the intermediate drive and also connects the low feed line 296, which is still connected by the upshifted low valve 302 to low line 103, to restricted exhaust 297 to start dis-engagement of low. Though solenoid 319 is simultaneously de-energized to close vent valve 318 to fill downshift chamber 316, low valve 302 is not downshifted until there is sufficient reduction of pressure in low line 103 connected via branch 324, low valve 302, low feed line 296, upshifted intermediate valve 281, to restricted exhaust 297 to permit escape of fluid from upshift chamber 307 through restriction 309, low relief line 308, downshifted low low valve 331 to branch 357 and low line 103 to permit downshift of low valve 302. The low valve 302 on downshifting connects low line 103 via branch 324 to low exhaust line 298 and upshifted intermediate valve to controlled exhaust port 301 and line 300 so exhaust is restricted by restriction 446 until trimmer valve 431 raises the intermediate apply pressure to a predetermined value and then provides a free exhaust to exhaust 447. The disengagement of low drive is thus delayed by the exhaust control porting of trimmer valve 431. The neutral trimmer boost line 376 is connected by upshifted low valve 302 to exhaust 323 and by downshifted low valve via low feed line 296 and intermediate valve 281 to exhaust 297 which provides an exhaust. The intermediate clutch line 113 is connected for initial low pressure regulation and the gradual increase to a high pressure by trimmer valve 431 as boosted by pressure in line 417. The downshifted low shift valve 302 also connects ratio feed line 231 via restriction 326, shift valve 302 and intermediate hold line 288 opened by the upshifted intermediate valve 281 to supply pressure to the upshift chamber 286 of the intermediate valve 281 to hold this valve in upshift as long as the low shift valve 302 is downshifted and downshifted high shift valve 246 blocks line 277. Upshift chamber 286 is filled since intermediate release line 277 is blocked by downshifted high valve and branch 289 is blocked by upshifted intermediate valve. The intermediate valve 281 on upshifting connects high release line 253 to exhaust 279.

When the manual switch is moved for a 3–2 downshift, the solenoid 292 is closed establishing pressure in the downshift chamber 287 of the intermediate valve 281, but the pressure in the upshift chamber 286 and spring 284 still maintain the valve in the upshift position. The simultaneous actuation of solenoid 319 vents downshift chamber 316 of the low valve 302 and this valve upshifts first so the low line 103 is disconnected from low exhaust line 298 and connected to low feed line 296 which at intermediate valve 281 is connected to exhaust 297 to condition this valve for this downshift. The upshifted low valve 302 also exhausts intermediate hold line 288 to the low pressure exhaust line 276 to permit downshift of the intermediate shift valve 281. The downshifted intermediate valve 281 connects intermediate feed line 271 to low feed line 296 to engage low through the upshifted low valve and intermediate line 113 to intermediate exhaust line 273, downshifted high valve 246, and controlled exhaust line 270 to disengage intermediate. Controlled exhaust line 270 is initially restricted by restriction 270' until low pressure in line 103 reaches a predetermined value and moves trimmer valve 451 to provide a free exhaust to exhaust 460.

When the manual switch moves from third to fourth ratio the solenoid 292 remains activated and the others deactivated so there is no change in the range controls including the intermediate valve 281 which is in the upshift position. Thus the range gearing remains in intermediate ratio. In order to make a splitter upshift the solenoid 396 is de-energized closing valve 394 to pressurize upshift chamber 392 and the solenoid 389 is energized to vent the downshift chamber 386 to upshift the splitter shift valve 381 so ratio feed line 231 is connected to the splitter high line 83 to establish the splitter high ratio while the splitter low line 85 is connected to exhaust 402. The flow through orifice 387 to the vent 388 of the now open solenoid valve 389 is not significant.

On a 4–3 shift of the manual switch solenoid 389 is de-energized, the solenoid 396 energized to downshift the splitter shift valve 381 to establish low ratio. The downshifted splitter valve 381 connects ratio feed line 231 to splitter low branch 398 and line 85 which is connected through restriction 387 to fill downshift chamber 386 to hold the valve 381 downshifted and through port 487 to trimmer valve 481 for regulation for smooth engagement of splitter low and connects splitter high line 83 to controlled exhaust port 401 and line 493 for a controlled exhaust, initially restricted and then free, for proper overlap.

On a shift of the manual switch 268 from fourth to fifth ratio, the solenoid 292 is de-energized to pressurize the downshift chamber 287 but while the upshift chamber 286 is filled the spring holds the intermediate valve 281 in the upshift position. The simultaneous energization of solenoid valve 258 venting downshift chamber 256 permits the spring 249 to upshift the high shift valve 246. The upshifted high valve 246 connects ratio feed line 231 to high line 115 to engage high ratio in the range unit and connects intermediate line 113 via upshifted intermediate valve 281, intermediate feed line 271, upshifted high valve 246 to exhaust 272 to disengage intermediate drive. Also the upshifted high valve connects intermediate release line 277 to exhaust 278 to permit downshifting of the intermediate shift valve 281. The intermediate line 113 on downshift of intermediate valve 281 is connected to intermediate exhaust line 273, which the upshifted high valve 246 connects to exhaust 274 and controlled exhaust line 275. The neutral trimmer boost line 376 in fourth is connected by the downshifted reverse valve 361 and feed line 351 downshifted low low valve 331 and feed line 322, downshifted low valve 302 and feed line 296 and upshifted intermediate valve 281 to exhaust 297 is on downshift of intermediate valve 281 in fifth ratio further connected to intermediate feed line 271 and upshifted high valve 246 to exhaust 272. The downshift of the intermediate valve 281 blocks high release line 253 and fluid from ratio feed line 231 flowing via restriction 252 to the upshift chamber 251 pressurizes this chamber to hold the high valve in the upshift position. Simultaneously there is a splitter downshift effected by the manual switch 268 de-energizing solenoid 389 and energizing solenoid 396 to vent upshift chamber 392 permitting the spring 386 to downshift the splitter shift valve 381 connecting ratio feed line 231 to the splitter low line 85 venting splitter high line 83 to exhaust 401. The pressure increase in splitter low line 85 is controlled by trimmer valve 481 and through restriction 387 fills downshift chamber 386 to hold the splitter valve upshifted and thus smoothly engages splitter low for 5th ratio. The splitter high exhaust 401 is connected by exhaust line 493 to the exhaust control port 494 of trimmer valve 481 to delay the exhaust. Also the downshifted splitter shift valve connects intermediate exhaust in controlled exhaust line 275 via port 403 to controlled exhaust line 493, which has splitter high exhaust from port 401 so both exhausts must flow through restriction 496 until splitter low pressure reaches a predetermined value and then the exhaust is free to exhaust 497. On this 4–5 shift where two motors must be actuated and two motors released, a double transition shift, the exhaust from both motors being released must pass through the same restriction used on single transition shifts where one motor is engaged and another released. Thus on this double transition shift the disengagement of both intermediate and splitter high is controlled by trimmer valve 481 so the change from a restricted exhaust to a free exhaust which terminates torque transmission is simultaneous. When this occurs splitter or low starts engagement, and during initial partial engagement range high is engaged so the overall drive torque transmission is gradual under the control of the splitter trimmer valve 481.

On a 5–4 shift of the manual switch 268, solenoid 258 is de-energized pressurizing downshift chamber 256, but since the upshift chamber 251 is pressurized, spring 249 holds the high valve 246 in the upshift position until upshift of the intermediate valve 281. The switch at the same time energizes solenoid 292 to vent downshift chamber 287 to permit the spring 284 to upshift the intermediate valve 281. As on a 2–3 shift, on upshifting intermediate valve 281, low feed line 296 is disconnected from intermediate feed line 271 and connected to exhaust 297 to maintain neutral boost line 376 exhausted intermediate line 113 is disconnected from intermediate exhaust line 273 and connected to intermediate feed line 271 for engagement of intermediate on subsequent downshift of high valve 246, low exhaust line 298 is disconnected from low pressure line 276 and connected to controlled exhaust branch 301 and line 297 to maintain low disengaged, intermediate release line 277 branch 289 is blocked so on high valve downshift to block line 277 upshift chamber 286 will fill to hold he intermediate valve upshifted and high release line 253 is unblocked and connected to exhaust 279 permitting downshift of the high valve 246. Downshifted high valve connects ratio feed line 231 to the intermediate feed line 271 to engage intermediate through the upshifted intermediate valve 281 and connects the high clutch line 115 to exhaust 279 to disengage high ratio.

The splitter solenoid 396 is de-energized to fill upshift chamber 392 and solenoid 389 is energized to exhaust downshift chamber 386 to upshift splitter shift valve 381. The upshifted splitter valve connects ratio feed line 231 to splitter high line 83 to engage splitter high and connects splitter low line 85 to exhaust 402 to disengage splitter low.

On a shift of the manual switch 268 from fifth to sixth ratio position, the solenoid 258 remains energized and the others de-energized so the range controls with high shift valve 246 upshifted remain as in fifth ratio establishing high in the range gearing. Solenoid 396 is de-energized pressurizing upshift chamber 392 while solenoid 389 is energizing venting downshifting chamber 386 to upshift the splitter shift valve 381 to connect ratio feed line 231 to splitter high line 83 and connects splitter low line 85 via branch 398 to exhaust 402 to shift the splitter gear unit to high ratio.

On a 6th to 5th ratio shift, the range controls and gearing remain the same providing high drive. The splitter shift valve is downshifted as in the above 4th to 3rd ratio shift to provide low splitter drive.

Any failure of the electric system to energize and operate one or more or all of the solenoids intended to be electrically operated in each forward ratio position would not cause the transmission to shift to a neutral condition, but will maintain a ratio engaged. When the transmission is in first ratio, solenoid 347 is energized to vent downshifted chamber 342 and low low line 73 is connected via restriction 327 to pressurize upshift chamber 336 to hold low low valve 331 unshifted. If solenoid 347 is de-energized by electrical failure to pressurize downshift chamber 343, the pressures will be balanced and spring 334 will maintain the low low valve 331 in the upshift position. If on an upshift to second ratio, solenoid 319 is energized, venting downshift chamber 316 to upshift the low valve 302, the low valve would connect the low feed line 296 to low clutch line 103 and connect the low low line 73 via branch 354, low low valve 331, the low low feed line 332 and the low shift valve 302 to exhaust 323. The neutral trimmer boost line 376 will remain connected to exhaust 352 at the low low valve 331. Otherwise, it would be the same as a normal shift.

When the transmission is in second ratio, a failure of solenoid 319 permitting pressurization of downshift chamber 316 of the low valve 302 would not be effective to downshift the low valve since low line 103 is connected via branch 357 and the downshifted low low valve 331 to the low release line 308 to the upshift chamber 307 to balance the pressures on the valve so that the spring 306 would maintain the valve in the upshifted position to hold low range ratio. If on a subsequent 2–1 shift of the manual switch solenoid 347 is energized, low low valve 331 will upshift and a normal 2–1 downshift will occur.

When the control is in third or fourth ratio, failure of solenoid 292 permitting pressure to build up in downshift chamber 287 will not downshift intermediate valve 281 since it is balanced by pressure in upshift chamber 286 so the spring holds the valve in the upshift position. If on a 3–2 shift, solenoid 319 is energized, the low valve 302 will upshift venting upshift chamber 286 of the intermediate valve 281 via intermediate release line 288 to low pressure exhaust line 276 to permit the intermediate valve to downshift to provide a normal 3–2 shift. If on an upshift to fifth or sixth ratio, with intermediate solenoid failed and intermediate shift valve unshifted, the solenoid 258 does not function, intermediate range drive will remain established and if it functions to vent downshift chamber 256, the spring 249 will upshift the high valve 246. The high valve 246 in the upshift position will connect ratio feed line 231 to high line 115 to engage high ratio and connect intermediate line 113 via the upshifted intermediate valve 281 to the intermediate feed line 271 and vent at the high valve 246 to exhaust 272 for an intermediate to high shift. It will be noted that the neutral boost line will be connected through the lower ratio valve and at the intermediate valve 281 to exhaust 297. When high valve 246 upshifts the intermediate hold line 277 will be connected to exhaust 278 permitting the intermediate valve to downshift to reestablish a normal connection connecting the neutral boost line via intermediate feed line 271 and high valve 246 to exhaust 272 and connecting intermediate line 113 via intermediate valve to intermediate exhaust line 273 at high valve 246 to exhaust 274.

If, when the transmission is operating in fifth and sixth ratios, failure of solenoid valve 258, causing pressurization of downshift chamber 256, will not downshift the high valve since the upshift chamber 251 is pressurized from ratio feed line 231 to balance the downshift pressure and the spring 249 holds the valve in the upshift position. If in 5th or 6th and solenoid 292 is inoperative a downshift to 4th or any lower ratio including neutral cannot be made. If it is operative a normal 5–4 shift is made.

On complete electrical failure before start up the splitter shift valve 381 will be positioned by priority pressure in chamber 392 in the high position engaging splitter high ratio. If the splitter shift valve is in the low position and solenoid 396 fails, it will remain in low. If the splitter shift valve is in high when failure of solenoid 389 occurs, it will remain in high, since the upshift chamber is filled and the downshift chamber 386 is connected by low line 85 and the splitter shift valve to exhaust 402. If only solenoid 396 is functioning a high to low shift can be made but a low to high shift cannot be made. If only solenoid 389 is functioning a splitter low to high shift can be made but a high to low shift cannot be made.

Thus this transmission in all these forward drives under any combination of failures of the electrical remote control system, will remain in the last ratio established before failure and will either upshift or downshift to any other ratio where the remote control system is operative. If operating in second ratio, a shift to 3rd and 4th ratio is impossible due to failure of solenoid 292. If solenoid 258 is functional, a shift from 2nd to 5th or 6th ratio can be made. However, if the transmission is in 5th or 6th ratio, a failure of solenoid 292 will prevent downshifting to low ratio even if solenoid 319 functions. Thus when operating in a lower ratio an upshift can be made to any higher ratio with an operative electric system even though an intervening ratio electric control system is inoperative.

When operating in a higher ratio a downshift can only be made if the electric system for the next lower ratio is inoperative.

If unblocking solenoids 312 and 339 are operative a downshift from second to neutral can be made.

The above described transmission may be modified within the scope of the appending claims.

We claim:

1. In a transmission; multiratio gear means having a plurality of fluid motor means each operative for establishing a ratio drive in a series of increasing ratio drives; a source of fluid under pressure, a plurality of shift valve means each operatively connecting said source to each motor means having an upshift position for actuating one motor means for establishing one ratio drive and a downshift position for actuating said one motor means for disestablishing said one ratio drive; and control means operatively connected to each shift valve means selectively operable in each of a plurality of ratio positions to upshift a different selected one of each of said shift valve means and to provide a downshift bias on the other of said shift valve means and including latching means operatively connected to each of said shift valve means operative on upshifts from lower to higher ratios and downshifts from higher to lower ratios to delay movement of the downshifting shift valve means until any selected upshifting shift valve means has completed its upshift and then to permit downshift movement of said last mentioned downshifting shift valve means.

2. The invention defined in claim 1 and said shift valve means having a series of shift valves, said source being connected to the highest ratio shift valve and said highest ratio shift valve when upshifted connecting said source to the highest ratio fluid motor means and when downshifted to the next lower ratio shift valve and each next lower ratio shift valve when upshifted connecting fluid from the next higher shift valve to its respective fluid motor means and when downshifted to the next lower shift valve.

3. The invention defined in claim 2 and said latching means including for each shift valve an upshift chamber and means to supply and maintain fluid pressure therein when the next lower, if any and the next higher, if any, shift valves are downshifted.

4. The invention defined in claim 2 and said latching means including for each of a series of shift valves an upshift chamber and means to supply and maintain fluid pressure therein operative on each intermediate ratio shift valve only when both adjacent shift valves are downshifted and operative on the endshift valves when the next adjacent shift valve is downshifted.

5. The invention defined in claim 4 and said latching means including means responsive to said control means to unlatch the lowest and the next to the lowest shift valves means in response to a neutral signal for a direct shift from the next to the lowest ratio to neutral.

6. In a transmission; multiratio gear means having a plurality of fluid motor means each operative for establishing a ratio drive in a series of increasing ratio drives; a source of fluid under pressure, a shift valve means for operatively connecting said source to each motor means having an upshift position for actuating one motor means for establishing one ratio drive and a downshift position for disestablishing said one ratio drive; control means operatively connected to each shift valve means selectively operable in each of a plurality of ratio positions to upshift a different selected one of each of said shift valve means and to provide a downshift bias on all the other shift valve means including latching means operatively connected to each of said shift valve means operative on all shifts from higher to lower and lower to higher ratio drives to delay movement of the downshifting shift valve means until the upshifting shift valve means has completed its upshift and then to permit downshift movement of said last mentioned downshifting shift valve means.

7. The invention defined in claim 6 and said shift valve means including shift valves; said latching means including an upshift chamber on each shift valve, said shift valves being operative on an upshift to supply an engaging pressure to a ratio fluid motor means and to said upshift chamber of said latching means to hold said shift valves upshifted, said control means having latching control means to disable said latching means and the next adjacent shift valve having latching control means operative when upshifted disabling the latching means of the other shift valve.

8. The invention defined in claim 7 and said latching control means of said control means including a solenoid vent valve to vent said upshift chamber.

9. The invention defined in claim 6 and said latching control means including means to continuously supply a restricted volume of fluid to a upshift chamber and means controlled by each adjacent shift valve in the upshifted position to provide a free exhaust from said upshift chamber to depressuring the upshift chamber.

10. In a transmission; multiratio gear means having a plurality of fluid motor means each operative for establishing a ratio drive of a series of three or more increasing speed ratio drives; shift means including a shift valve means for each ratio drive of said series of ratio drives having a feed, a ratio supply and an exhaust, each shift valve means in the upshift position connecting its feed to its ratio supply and connecting the feed of the next lower speed ratio shift valve means to exhaust and a downshift position connecting its ratio supply to exhaust and its feed to the feed of the next lower shift valve means; a source of fluid under pressure connected to the feed of the highest speed ratio shift valve means; manual control means operatively connected to each shift valve means to provide a signal to selectively upshift any selected one of said shift valve means and said shift means being operative to engage the ratio drive engaged by the highest upshifted shift valve means; and latching means interconnected with each shift valve means operative as long as a selected one of said shift valve means is upshifted and each adjacent shift valve means in said series is downshifted to prevent said selected one of said shift valve means being downshifted unless another adjacent shift valve is first upshifted for the establishment of connections for another ratio to block disengaging of any previously engaged ratio drive until the manual control means has upshifted another shift valve means for engagement of the selected ratio drive on disengagement of the previously engaged ratio drive.

11. The invention defined in claim 10 and said latching means permitting downshifts of each shift valve means only when the next lower shift valve means is operated and permitting upshifts when any higher shift valve means is operated.

12. The invention defined in claim 10 and said latching means including an upshift chamber for each shift valve means and means controlled by each adjacent shift valve means when both are in the downshift position to maintain a pressure in said upshift chamber to block a downshift and operative in response to upshift of either adjacent shift valve to vent said upshift chamber to permit downshift of each shift valve means.

13. The invention defined in claim 10 and said latching means including an upshift chamber operative to hold an upshifted shift valve upshifted in the absence of said upshift signal and means connect the supply of a shift valve to said upshift chamber and a solenoid vent valve actuated by said control means to vent said upshift chamber when said signal to said valve is discontinued.

14. In a transmission; multiratio gear means having a plurality of fluid motor means each operative for establishing a series of at least three ratio drives; a source of fluid under pressure, a shift valve means for operatively connecting said source to each motor means having an upshift position for actuating each motor means for establishing each ratio drive and a downshift position for connecting each motor means to exhaust for disestablishing each ratio drive; control means operatively connected to each shift valve means selectively operable in each of a plurality of ratio positions to upshift a selected one of said shift valve means and to provide a downshift bias on the other shift valve means; and exhaust control means operative on a downshift to initially provide a restricted exhaust from the higher ratio motor and operative in response to a predetermined pressure increase in the intermediate motor to provide a free exhaust for said higher motor and on an upshift to provide a restricted exhaust from the lower motor and operative in response to a predetermined pressure increase in the intermediate motor to provide a free exhaust from said lower motor.

15. The invention defined in claim 14 and said exhaust control means including a regulator valve connected to the intermediate ratio motor to provide an initial low pressure and a gradually increasing pressure and movement of the regulator valve during its regulation cycle changing said higher and said lower ratio motor exhaust from a restricted to a free exhaust.

16. In a transmission; multiratio gear means including a plural ratio range gear unit and a plural ratio splitter gear unit connected in series to provide a plurality of combination transmission drives; said range unit having a plurality of fluid operated motor means each operative to establish a range ratio drive; said splitter unit having a plurality of fluid motor means each operative to establish a splitter ratio drive; a source of fluid under a controlled pressure; control means having exhaust means providing a restricted exhaust and responsive to a predetermined pressure rise operative to provide a free exhaust; shift valve means operatively connecting said source in one position to a first range motor means and a first splitter motor means and exhaust a second range motor means and a second splitter motor means and operative in a second position to connect said first range motor means and said splitter range motor means to said exhaust means and said source to supply said second range motor means and said second splitter motor means and to said control means to change said exhaust means from restricted to free exhaust to control the timing of the exhaust of said first motor means relative to the supply of said second motor means.

17. The invention defined in claim 16 and said shift valve means operative on movement from said first to a third position maintaining said connection to said first range motor means, connecting said first splitter motor means to said exhaust means and connecting said source to said second splitter motor means and said control means to control the exhaust change from restricted to free relative to the pressure rise in said second splitter motor means.

18. In a transmission; multiratio gear means including a plural ratio range gear unit and a plural ratio splitter gear unit connected in series to provide a plurality of combination transmission drives; said range unit having a plurality of fluid operated motor means each operative to establish a range ratio drive; said splitter unit having a plurality of fluid motor means each operative to establish a splitter ratio drive; a source of fluid under a controlled pressure; pressure regulator valve means operative on the initial supply of fluid under pressure to regulate the pressure at an initial low value and to thereafter gradually increase the regulated pressure to said controlled pressure and having exhaust control means providing an initial restricted exhaust and operative during control of the pressure to thereafter provide a free exhaust; and shift valve means operatively connecting said source to a range motor means and a splitter motor means in each of a plurality of positions and operative on movement from one position to another to connect a previously supplied range and splitter fluid motor means to said exhaust control means and to connect said source to another previously exhausted range and splitter fluid motor means and to said pressure regulator valve means to control the timing of the exhaust from said previously supplied range and splitter fluid motor means from a restricted to a free exhaust.

19. The invention defined in claim 18 and said regulator valve means conjointly controlling the timing for simultaneous change of the exhaust of both said splitter and range fluid motor means from a restricted to a free exhaust to simultaneously terminate torque transmittal.

References Cited

UNITED STATES PATENTS

| | | | |
|---|---|---|---|
| 2,713,800 | 7/1955 | Forster | 74—857 |
| 2,929,478 | 3/1960 | Tuck et al. | 192—87 |
| 2,950,629 | 8/1960 | Holdeman et al. | 74—863 |
| 3,025,723 | 3/1962 | Miller | 74—732 |
| 3,058,374 | 10/1962 | Miller | 74—754 |
| 3,080,764 | 3/1963 | Miller et al. | 74—759 X |
| 3,101,012 | 8/1963 | Christenson et al. | 74—759 X |
| 3,146,630 | 9/1964 | Ivey | 74—869 |
| 3,170,534 | 2/1965 | Kelley et al. | 74—677 X |
| 3,270,586 | 9/1966 | Tuck et al. | 74—677 |
| 3,274,858 | 9/1966 | Meyer et al. | 74—761 |

WILLIAM L. FREEH, Primary Examiner

T. C. PERRY, Assistant Examiner

U.S. Cl. X.R.

74—732, 759; 192—3.29

PO-1050
(5/69)

UNITED STATES PATENT OFFICE
CERTIFICATE OF CORRECTION

Patent No. 3,505,907      Dated April 14, 1970

Inventor(s) Joseph R. Fox, Jerry R. Marlow & Robert H. Schaefer

It is certified that error appears in the above-identified patent and that said Letters Patent are hereby corrected as shown below:

In the Specification: Column 1, line 42 "diengaging" should be -- disengaging --; Column 1, line 66 "value" should be -- valve --; Column 3, line 32 "value" should be -- valve --; Column 5, line 4, between "low" and "line" insert -- low --; Column 5, line 26 "ration" should be -- ratio --; Column 5, line 35 "37" should be -- 38 --;

Column 9, line 9, "negage" should be -- engage --; Column 10, line 11 "downshift" should be -- downshifted --; Column 10, line 29, "239" should be -- 249 --; Column 11, line 26 "pressure" should be -- pressurize --; Column 12, line 27 "734" should be -- 73 --; Column 14, line 21 "basing" should be -- biasing --; Column 17, line 14 "low" should be -- flow --; Column 17, before the title " Operation of Control System" insert the following sentence -- If line 45' from line 191 is connected to pressure switch 506 downshifts are inhibited whenever the lockup shift valve 186 is upshifted.--;Column 19, line 43, after "83" delete "Low in the splitter is engaged but is not part of the drive"; Column 20, line 5, between "low" and "valve" insert -- low --; Column 20, line 16, between "that" and "the" insert -- with --; Column 20, line 34, between "trimmer" and "line" insert -- boost --; Column 23, line 22 "he" should be -- the --; Column 24, line 23 "unshifted" should be -- upshifted --. Column 6, line 69, "the" should read -- and --.

SIGNED AND SEALED
SEP 15 1970

(SEAL)
Attest:

Edward M. Fletcher, Jr.
Attesting Officer

WILLIAM E. SCHUYLER, JR.
Commissioner of Patents